United States Patent [19]

Vugrek

[11] 4,019,715
[45] Apr. 26, 1977

[54] CABLE BLOCK

[75] Inventor: Andrija Vugrek, Madison, N.J.

[73] Assignee: Western Electric Company, Inc., New York, N.Y.

[22] Filed: June 9, 1976

[21] Appl. No.: 694,425

[52] U.S. Cl. .................... 254/134.3 R; 254/190 R
[51] Int. Cl.² .......................................... E21C 29/16
[58] Field of Search ........ 254/134.3 CL, 134.3 PA, 254/134.3 R, 190 R; 24/134 KB

[56] References Cited

UNITED STATES PATENTS

| 647,795 | 4/1900 | Bertrang | 24/134 KB |
| 2,192,002 | 2/1940 | Bond et al. | 24/134 KB |
| 3,134,575 | 5/1964 | Walter | 254/134.3 CL |
| 3,834,674 | 9/1974 | Jackson | 254/134.3 R |
| 3,853,304 | 12/1974 | Jackson | 254/134.3 PA |
| 3,970,286 | 7/1976 | Ross | 254/134.3 R |

Primary Examiner—Al Lawrence Smith
Assistant Examiner—Robert C. Watson

Attorney, Agent, or Firm—K. R. Bergum; R. P. Miller

[57] ABSTRACT

A cable block particularly adapted for use in the installation of aerial cable comprises a main frame member formed at its upper end with an inverted V-shaped strand engaging hanger section, at its lower end with a U-shaped pulley support section, and with a spring-biased, wedging cam locking mechanism supported on the upper hanger section. The cam locking mechanism comprises a uniquely dimensioned and configured pair of wedging cams that are intercoupled and spring-biased through respectively associated, and mating spur gears. The cams are symmetrically disposed relative to, and grip, the interposed strand in such a manner that the cable block remains substantially vertically oriented on the strand at all times, and positively locked against movement selectively in either direction along the strand, regardless of the position of the open side of the cable block relative to the strand.

10 Claims, 9 Drawing Figures

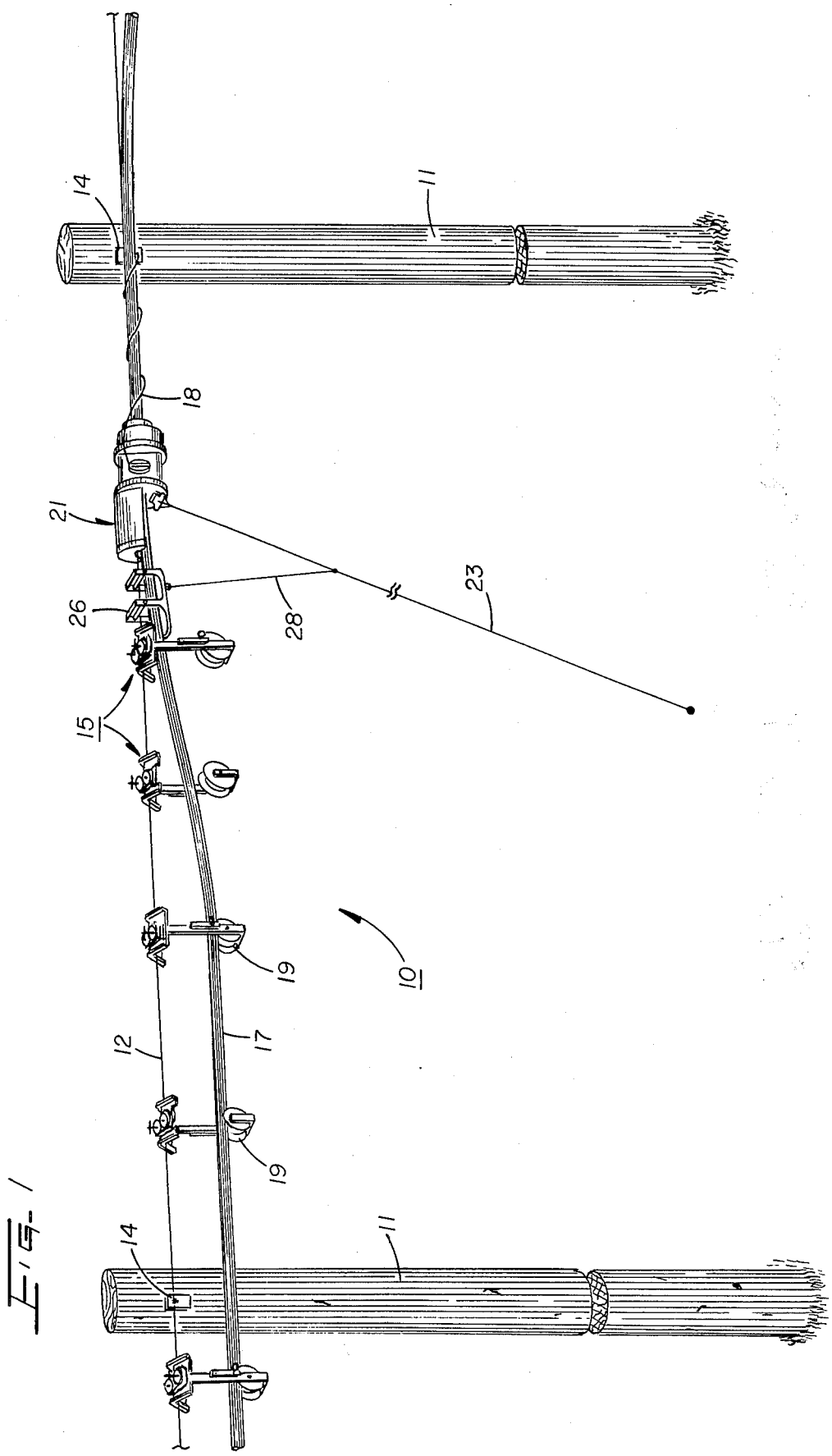

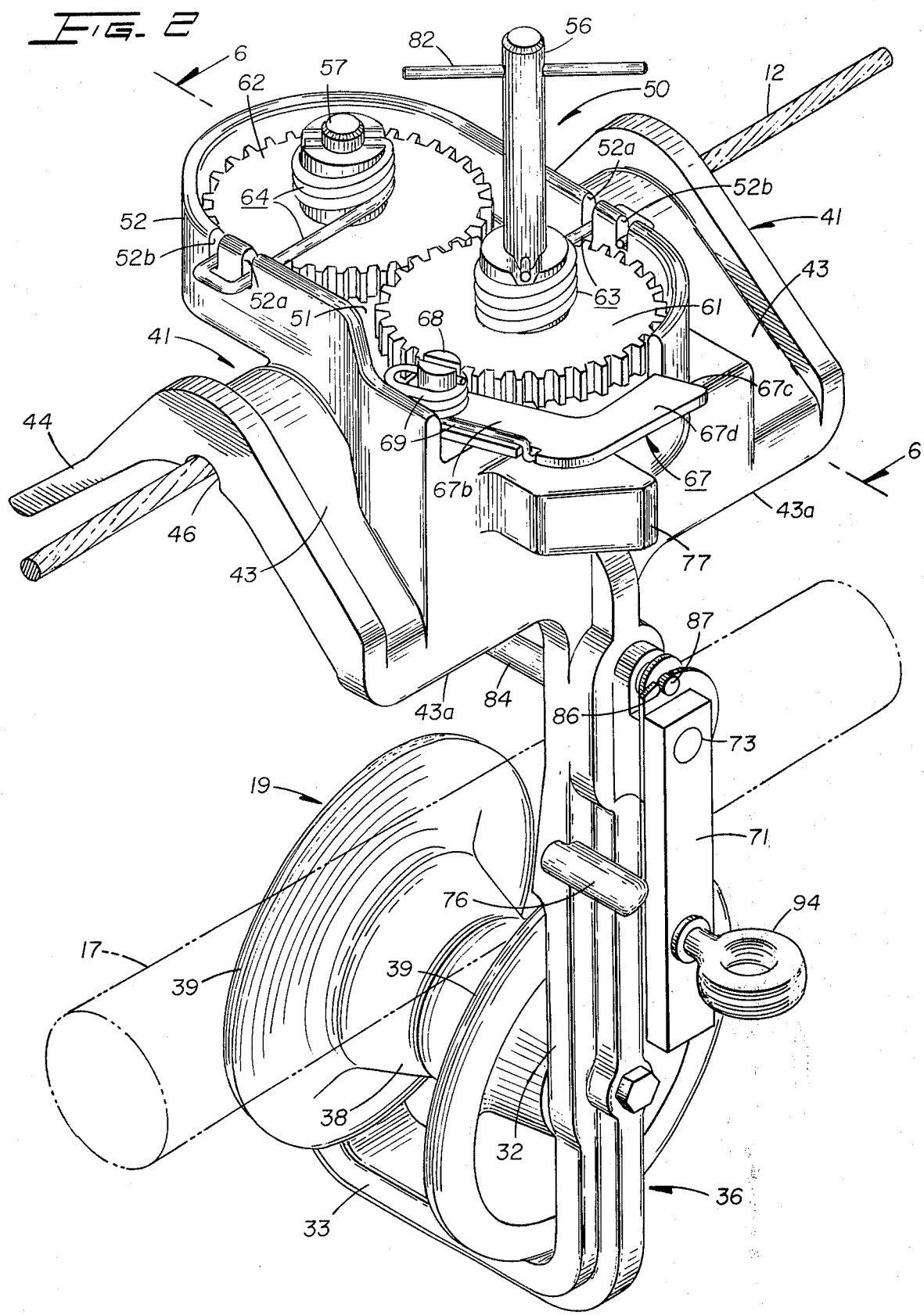

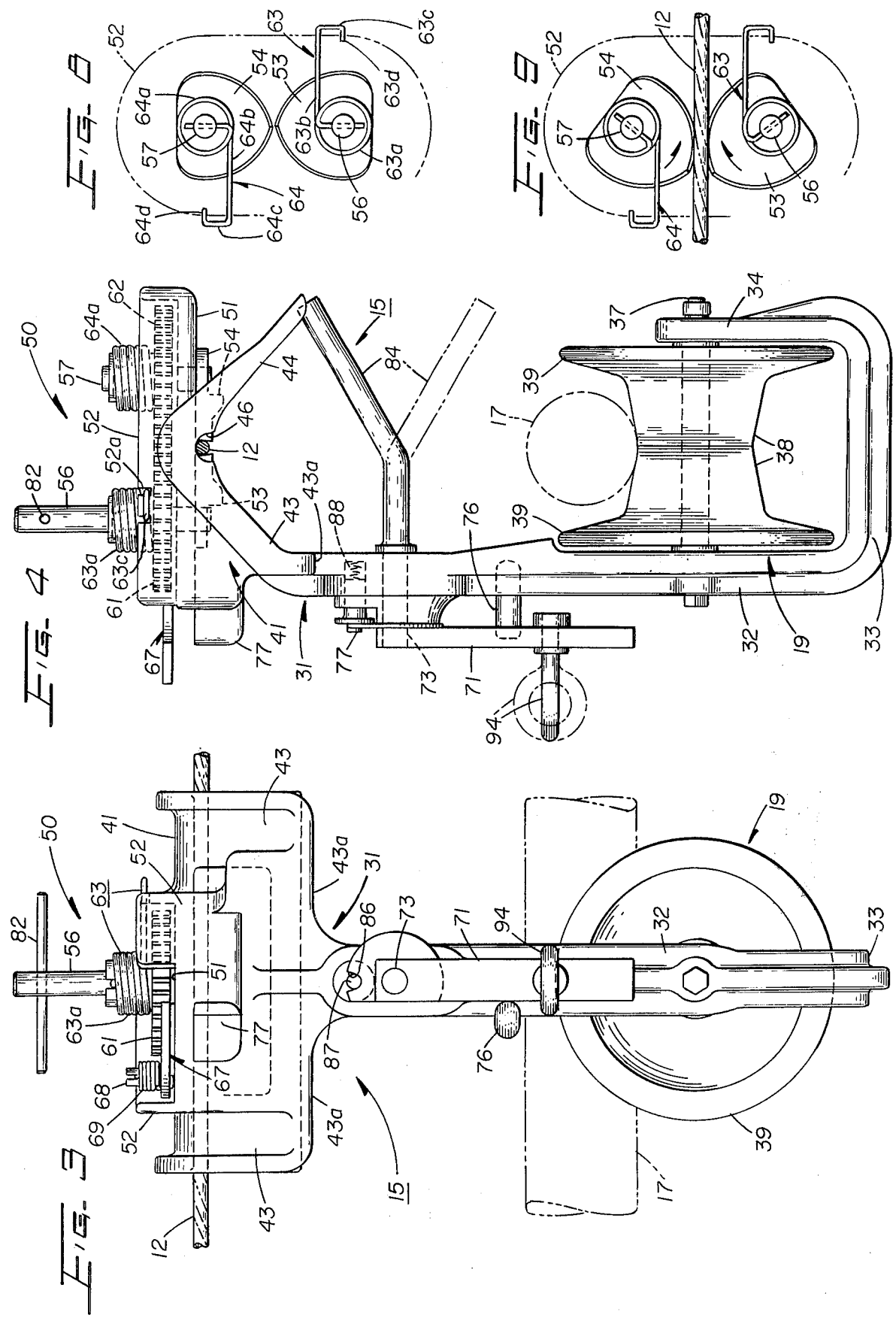

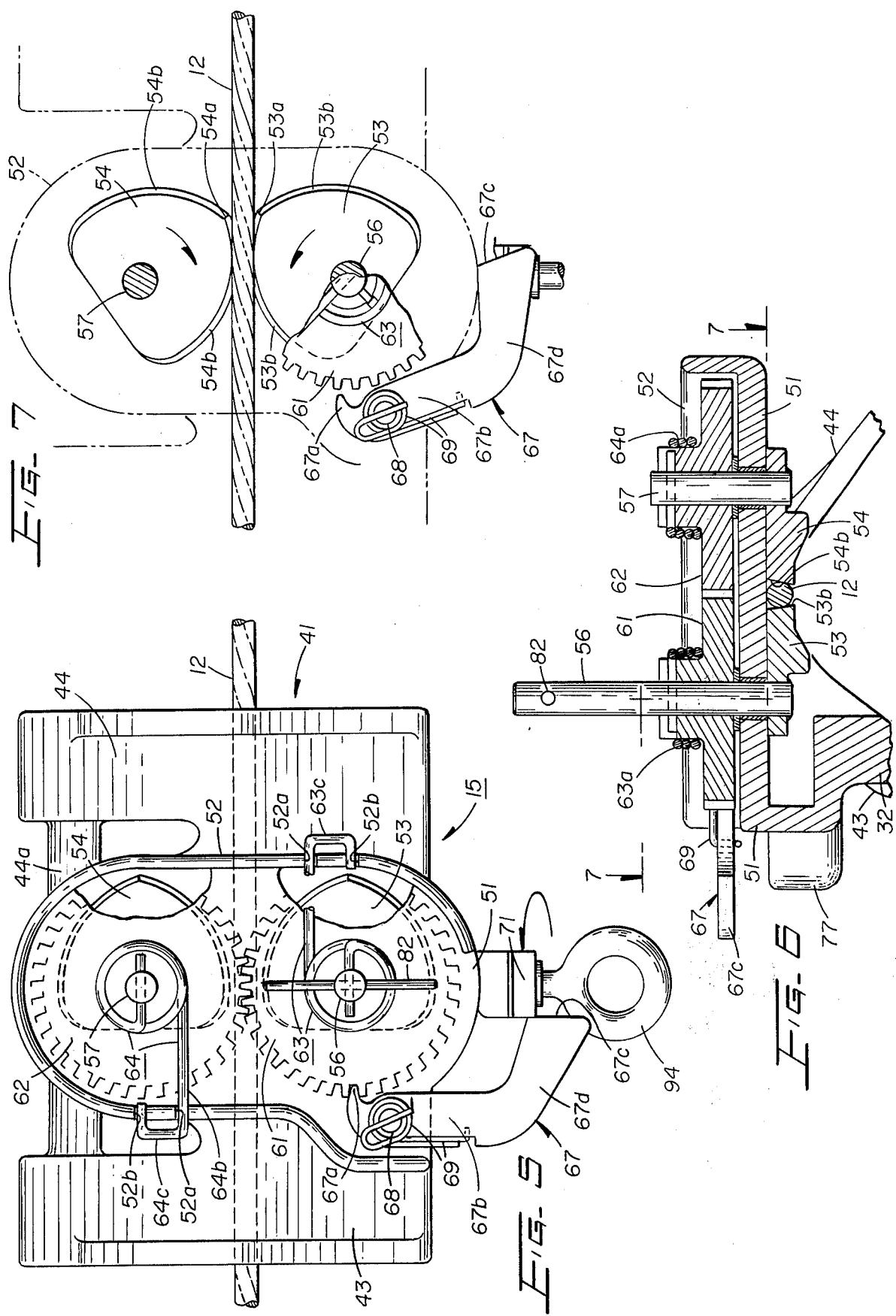

CABLE BLOCK

BACKGROUND OF THE INVENTION

1. Field of the Invention

This invention relates to the installation of cable and, more particularly, to a cable block for temporarily supporting a section of aerial cable prior to its being lashed to a supporting strand.

2. Description of the Prior Art

In the installation of aerial cable, a so-called lashing method is employed wherein the cable is secured to a supporting strand (or so-called messenger) by wrapping a fairly large gage lashing wire in spiral fashion therearound. Prior to the lashing operation, the aerial cable is temporarily supported in close proximity to the strand by a plurality of cable blocks mounted on the strand, and typically spaced apart at intervals ranging from 10 to 20 feet along a given span thereof, i.e., between a pair of utility poles. The cable blocks are subsequently cumulatively pushed along each successive span of the strand by and ahead of a lashing machine. Upon reaching any given pole defining the end of a lashed cable span, the then stacked array of cable blocks are removed from the strand by a workman, and re-mounted in a spaced array along the next succeeding span of the strand. Thereafter, the lashing machine is also transferred to the other side of the then adjacent pole, and positioned on the strand in front of the first re-mounted cable block in readiness for lashing a new section of cable to the strand along that particular span. In some applications, new cable is lashed to existing cable previously lashed to the strand.

In such an aerial cable installation, it is appreciated that the cable blocks should be constructed such that they are reliably and easily mounted on the supporting strand, and readily movable in singular and tandem fashion therealong in the direction of movement of the lashing machine. It is also very important, however, that such a cable block incorporate means to effectively lock it with respect to longitudinal movement in the opposite direction.

Effective unidirectional locking of the cable blocks is very important as the un-lashed cable supported thereby tends to exert variable and appreciable longitudinally directed forces on the blocks in the direction of the lashing machine. Such forces are most pronounced during the threading of a winch line over the respective pulleys of the spaced array of cable blocks, and while the free end of a new reel of cable is pulled thereby over the rollers preparatory to the lashing of that unwound reel of cable to the supporting strand. Even after a portion of a new unwound reel of cable has been temporarily supported by the spaced array of cable blocks along any given span between two utility poles, any excess length of such cable that extends between the last cable block and the ground (or supply reel on the ground) will exert a substantial longitudinal force, in the direction of the lashing machine, against that block initially and, thereafter, possibly against one or more adjacent blocks in a cumulative fashion if they are allowed to become bunched. Thus, unless a positive locking mechanism is incorporated in the cable blocks to prevent such displacement, they can very readily defeat the purpose intended therewith.

It is also important that the cable blocks grip the strand such that they remain in a substantially vertically oriented position at all times so as to facilitate the guiding of the cable therethrough, as well as through the lashing machine. This also minimizes any tendency of the cable blocks to become jammed on the strand while being cumulatively pushed in tandem by the lashing machine, and also minimizes the possibility that the blocks could become accidentally dislodged from the strand due to very strong gusts of wind, for example.

A prior cable block intended to provide all of the above-noted operating characteristics is disclosed in O. L. Walter patent, U.S. Pat. No. 3,134,575. That cable block utilizes a single spring-biased and pivotally mounted cam to effect the locking of the cable block from movement along the strand in one particular direction, while allowing relatively free movement in the opposite direction. The single cam employed is dimensioned and positioned such that it engages the strand from only one laterally disposed side thereof, and in a region where the frame on the cable block does not provide any form of a mutually disposed backstop so as to provide a symmetrical gripping or wedging action against the strand, i.e., from opposite sides thereof.

As a result, the single locking cam mechanism in question has been found to not always maintain the cable block vertically oriented on the strand while supporting a section of cable and being pushed along the strand, particularly during high wind conditions, because of the asymmetrical cam force exerted against the strand. In addition, such a mechanism has also been found to not always provide the degree of positive locking action desired, particularly during the aforementioned winch-line pull-through of a new length of cable, or when hilly terrain is involved.

In addition to the aforementioned desired and important operating characteristics that have been urgently sought in cable blocks heretofore, there has also been a need for a cable block that could be readily adjusted or controlled so as to selectively allow movement in either direction and, conversely, to selectively allow oppositely directed locking action, for a given as-mounted orientation of the block on the strand. This would be of particular advantage, for example, in allowing the open side of the asymmetrical cable blocks to be positioned on a given side of the support strand either because of adverse wind conditions, uneven terrain, or because of the close proximity of obstructions, such as trees or buildings along a particular span or spans of the supporting strand.

SUMMARY OF THE INVENTION

It, therefore, is an object of the present invention to provide a new and improved cable block of simplified, rugged and reliable construction, and which can readily and reliably be mounted on a supporting strand, maintained in a substantially vertical position, and be readily adjusted so as to allow relatively free selected longitudinal movement along the strand in either direction, relative to a given asmounted orientation on the strand, while being positively locked against any movement in the direction opposite to the selected direction.

In accordance with the principles of the present invention, the above and other objects are realized with a cable block comprising a main frame member formed at its upper end with an inverted V-shaped strand engaging hanger section, at its lower end with a U-shaped pulley support section, and with a spring-biased, wedging cam mechanism supported on the upper hanger frame section.

Considering the wedging cam mechanism more specifically, it comprises a pair of symmetrical and pivotal cams that are positioned so as to bias against opposite sides of an interposed strand, and are dimensioned such that they effect a wedging type of locking action against the strand for only one preselected direction of cable block movement relative to the strand. Advantageously, the particular direction in which the wedging action in question is effected depends only upon the spring-loaded orientation of the cams relative to the strand at the time the cable block is mounted on the latter, and not on what side the open side of the necessarily asymmetrical frame is located relative to the strand. As a result, the position of the open side of the cable block, relative to the strand, may be initially chosen so as to partially compensate for adverse wind conditions, or to facilitate the mounting of the block on the strand because of the close proximity of pole line obstructions, for example.

The symmetrical nature, configuration and wedging action of the cams also insures that the cable block, while being pushed along the strand, grips the latter in such a way that the block remains substantially vertically oriented at all times. This, of course, greatly minimizes the possibility of cable block jamming, or dislodgement from the strand.

The unique wedging cams are interconnected through a pair of mating spur gears so as to allow simultaneous pivotal movement thereof, but in opposite angular directions, and are spring-loaded through the spur gears so as to effect relatively uniform wedging action against an interposed strand for angular cam displacements on either side of a quiescent (unbiased) portion for each cam. A releasable gear locking mechanism permits the wedging cams to be locked temporarily, after being angularly displaced sufficiently from their quiescent positions, so as to allow the cable block to be initially mounted on the strand, with the latter being reliably confined between the spring-biased cams upon the release of the locking mechanism.

BRIEF DESCRIPTION OF THE DRAWINGS

FIG. 1 is a fragmentary, pictorial view of a typical supporting strand-aerial cable span between two utility poles, with an array of cable blocks embodying the principles of the present invention spaced apart along the strand, and with the blocks, in turn, temporarily supporting the cable preparatory to the latter being lashed to the strand by a cable lashing machine that cumulatively pushes the cable blocks ahead of it along the strand;

FIG. 2 is an enlarged, perspective view of one of the cable blocks of FIG. 1, as positioned on the supporting strand and selectively unidirectionally locked against movement by a spur gear-controlled cam mechanism of the type embodied herein, and with a fragmentary portion of cable being shown as temporarily supported on the rotatable pulley of the cable block;

FIG. 3 is a front elevational view of the cable block depicted in FIG. 2;

FIG. 4 is a side elevational view of the cable block depicted in FIG. 2, with the wedging cams shown in engagement with the supporting strand, and with an actuable safety-type keeper rod shown in a position to prevent any otherwise even remote possibility of accidental total disengagement of the cable block from the strand;

FIG. 5 is a plan view, partially broken away, of the cable block depicted in FIGS. 1–3 and, in particular, shows the intercoupled, cam-controlling spur gears thereof locked in a spring-biased position by a releasable locking mechanism so as to separate the wedging cams sufficiently to position a supporting strand therebetween;

FIG. 6 is a fragmentary, cross-sectional view of the upper section of the cable block, including the spur gear-controlled cam mechanism thereof, taken along the line 6—6 of FIG. 2;

FIG. 7 is a fragmentary view, taken generally along the line 7—7 of FIG. 6, showing the locking mechanism in a released position, and the wedging cams spring-biased against an interposed supporting strand at oppositely inclined angles relative thereto, so as to effectively lock the cable block from movement along the strand from left-to-right, as depicted;

FIG. 8 is a fragmentary view similar to FIG. 7, but with the spur gears and releasable locking mechanism removed so as to better illustrate the quiescent (unbiased) state of the respective wedging cams, and FIG. 9 is a fragmentary view similar in detail to that of FIG. 8, but distinguishing therefrom in that the respective wedging cams are spring-biased against an interposed strand at angles relative thereto that are respectively equal in magnitude, but opposite in inclination, to those depicted in FIG. 7, so as to effectively lock the cable block from movement along the strand from right-to-left, as depicted.

DETAILED DESCRIPTION OF THE INVENTION

General Background of Aerial Cable Installation

It should be appreciated that the cable block embodied herein, and described in greater detail hereinbelow, has universal application in that it may be suspended from any elongated member of generally circular cross-section defining a span between two spaced supports, and temporarily support a second elongated member of similar cross section in close proximity to the first until the two elongated members are permanently secured to each other along the span in a desired manner. However, for purposes of illustration, the subject invention is disclosed herein in connection with one preferred application, namely, the installation of aerial communication cable, wherein cable blocks of the type embodied herein are used to temporarily support the cable along each successive span prior to its being lashed to the supporting strand (or messenger).

In that connection, reference is first made to FIG. 1 which disclose a typical segment of a communications pole line including two spaced poles 11, and a supporting strand 12 that spans the distance therebetween at the desired elevation as a result of the strand being secured to each pole by suitable brackets 14.

As also depicted in FIG. 1, a plurality of cable blocks 15, embodying the principles of the present invention, are mounted on the strand 12 at spaced intervals generally ranging from 10 to 20 feet, and preferably alternately reversed in orientation (facilitated by the unique construction of the blocks), for safety reasons discussed in greater detail herebelow. Such placement is effected in the field either with a so-called bucket truck or from the ground with a modified tree pruner pole, for example. The cable blocks, as previously noted, are employed to temporarily support a cable 17 while it is in the process of being lashed to the strand 12 with a lashing wire 18.

Considering the lashing operation more specifically, a conventional cable lashing machine 21 effects a spiral winding motion to the lashing wire 18 as it is tightly wound about the strand and cable. The lashing machine is towed along the strand by means of a tow line 23. In some applications, new cable, as distinguished from the lashing wire 18, is lashed to existing cable already supported by the strand.

As the lashing machine 21 advances along the strand 12, it cumulatively pushes the spaced array of cable blocks 15 ahead of it until the end of a given span of the strand and cable is reached, whereupon the then juxtaposed array of cable blocks are removed from the strand by a workman and repositioned in a spaced array along the next span of the strand. Similarly, the lashing machine 21 is also transferred to the other side of the then adjacent pole and positioned in front of the first cable block 15 in preparation for the start of a new cable span lashing operation.

As also seen in FIG. 1, a cable guide 26 is mounted on the strand 12 between the lashing machine 21 and the cable block 15 nearest thereto. This guide facilitates the feeding of the cable 17 into the front end of the lashing machine by reason of its being secured to the tow line 23 through an auxiliary tow line 28. The cable guide 26 is also constructed with a front face portion that also serves to push the first cable 15 along the strand 12 in a manner that minimizes any tendency of that block to become tilted from a vertically oriented position. This, in turn, minimizes the possibility of that block, as well as any other blocks, becoming jammed as the lashing machine is continuously advanced along the strand.

Prior to a lashing operation, it is of paramount importance that the cable blocks 15 be reliably locked against movement along the strand in a direction opposite to the direction that cable lashing takes place. More specifically, at the beginning of any given cable installation, as well as when a new length of cable from a supply reel is to be connected to the terminating end of an installed cable, a pull-in-line (not shown) is initially drawn over the respective rollers 19 of the cable blocks 15, from left-to-right in FIG. 1, and thereafter used to pull the free end of a length of new cable from a supply reel (not shown) over the rollers, with any excess length of cable either being left on the reel, or laid out along the pole line on the ground.

Even after a given length of cable 17 has been drawn over the respective pulleys of a spaced array of cable blocks, the section of cable that extends from the forward block to the ground has a tendency to exert a substantial backward-directed longitudinal force against that block. Thus, if that block is not reliably locked against movement in the direction from left-to-right, as viewed in FIG. 1, it would tend to start a chain reaction whereby the blocks would be cumulatively pushed together and, thus, no longer temporarily support the cable at the necessary spaced intervals. The locking mechanism embodied in the cable blocks 15, which mechanism is of particular concern in accordance with the principles of the present invention, will now be considered in detail in connection with a description of the preferred embodiment of the composite cable block.

Preferred Embodiment of the Improved Cable Block

With specific reference first to FIGS. 3–5, the present cable block 15 is comprised of a main frame 31 constructed of any suitable material which is preferably cast or otherwise fabricated as a unitary member. The frame is formed with a vertically extending arm 32 that is integrally connected at its lower end to a horizontal leg 33 which, in turn, is connected to a short vertically oriented leg 34. The lower portion of the arm 32 and the legs 33, 34 form a U-shaped section 36 within and on which the aforementioned pulley 19 is rotatably mounted, by means of a suitably journalled shaft 37. The pulley 19 is formed with tapered hub shaped portions 38, and spaced flanged portions 39.

At the upper end of the vertically oriented arm 32, and integral therewith, is an outwardly extending hanger section 41 that overlies the pulley 19, as best seen in FIGS. 2 and 4. The hanger section is actually formed with an essentially inverted V-shaped configuration having planar wall portions 43, 44. These wall portions are oriented relative to each other so as to form a central and longitudinally extending vertex having an angle of approximately 90°. The vertex region is actually modified to form a substantially semi-circular groove 46 that is dimensioned so as to loosely and partially receive the supporting strand 12 therewithin.

In accordance with an aspect of the invention, a strand wedging cam mechanism 50, adapted to selectively lock the cable block from movement in either direction, is supported on a platform 51, formed as an integral part, and located on the top side, of the frame hanger section 41. The platform also includes an integral, discontinuous, peripheral side wall 52.

With particular reference to FIGS. 4, 6 and 7, the wedging cam mechanism 50 is comprised of a mutually disposed pair of identically configured pivotal cams 53 and 54 that are positioned adjacent the underside of the platform 51, and respectively supported on a pair of vertically oriented shafts 56, 57 that are suitably journalled in accommodating apertures formed in the platform. The cams 53, 54 are interconnected for simultaneous pivotal movement in opposite directions by means of a pair of mating spur gears 61, 62 secured respectively to the shafts 56, 57, as best seen in FIGS. 2 and 6.

The illustrative cams 53, 54 are essentially heart-shaped (FIG.7), with pronounced apices 53a and 54a. At least the peripheral edges of the cams that selectively come in contact with an interposed strand 12 are also slightly tapered upwardly and outwardly, as best seen in FIGS. 4 and 6. This results in the cams, when suitably spring-biased, not only wedging against an interposed strand from essentially diametrically disposed sides, but also causing the strand to be wedged against the underside of the platform 51 so as to effectively confine and grip the strand in a three-sided fashion. Such gripping of the strand has been found to be very effective in maintaining the suspended cable block vertically oriented at all times.

As depicted in FIG. 8, the cams 53, 54 are not only symmetrically configured, but diametrically disposed relative to an axial strand-defining centerline such that the apices 53a and 54a thereof do not quite contact each other when juxtaposed, i.e., when a strand is not confined therebetween. As a result, the cams may be simultaneously pivoted (in opposite directions relative to each other) such that their apices 53a, 54a move either to the right-or-left of an imaginary centerline that passes through both the pivot points and apices of the cams while positioned as depicted in FIG. 8. The particular oppositely inclined cam positions chosen for a given lashing operation, of course, determines the direction of the wedging or locking action imparted by the cams against the strand.

Considered more specifically, when the cams 53, 54 are oriented into the positions, and spring-biased in the angular directions indicated by the arrows, depicted in FIG. 7, the cable block 15 is effectively locked against displacement along the supporting strand 12 from left-to-right, as viewed. This results because any attempted forcing of the cable block in that direction will cause the peripheral, beveled contacting edges of the cams to bite progressively more forcefully into the strand, while simultaneously wedging the strand more tightly against the underside of the support platform 51. In the direction from right-to-left as viewed in FIG. 7, however, the cams 53, 54 allow relatively free movement of the cable block 15, with the lashing machine simply having to overcome the frictional forces exerted by the spring-biased cams against the essentially diametrically disposed outer surface regions of the support strand 12, plus the frictional contact made with the underside of the platform 51.

Conversely, when the cams 53, 54 are oriented into the positions, and spring-biased in the angular directions indicated by the arrows, depicted in FIG. 9, they effectively grip the strand 12 with a positive wedging action that prevents any appreciable movement of the cable block 15 along the strand in a direction from right-to-left, as viewed.

In order to impart selective, oppositely directed, spring-biased torque (or load) on each of the cams 53, 54, as required for the different angular positions depicted in FIGS. 7 and 9, a pair of specially constructed torsion springs 63, 64 are employed. These springs allow the cams to acquire quiescent or unbiased states when in the position depicted in FIG. 8. This is accomplished by forming each spring, such as 63, with both a helically wound section 63a, co-axially mounted on and secured to the associated shaft 56, and with an essentially U-shaped section. The latter section is comprised of a leg 63b that extends outwardly from the shaft, a leg 63c that extends perpendicularly to the preceding leg, and a folded-back leg 63d. The latter two legs of the spring 63 extend through and are confined within notches 52a and 52b formed in the vertically oriented side wall 52 of the platform 51, as best seen in FIGS. 2 and 5. As thus mounted, the spring 63 (as well as 64) may be readily assembled in the cam mechanism 50, as well as interchanged if ever necessary.

As previously mentioned, while the two torsion springs 63 and 64 are of identical construction, they are oppositely wound and oriented relative to each other. As such, upon the associated cams 53 and 54 being pivoted in opposite directions, so as to allow the strand 12 to be interposed therebetween, one spring, such as 64 in FIG. 5, is being wound while the spring 63 is essentially being unwound, but in opposition to an inherent biasing force that tends to urge that spring toward its unbiased or quiescent position depicted in FIG. 8.

In order to preload the cams 53, 54 for locking action in either selected direction along the support strand 12, as well as to allow sufficient space for the strand to be initially positioned therebetween, a locking lever or latch 67 is pivotally mounted on a shaft 68 that is secured to the platform 51, as best seen in FIGS. 2, 5 and 7. This latch is essentially in the form of a bell crank, with a gear-tooth-engaging end 67a that is normally biased counterclockwise, by a spring 69, to a position out of engagement with the adjacent spur gear 61 (see FIG. 7). While in this latter position, an outer edge region along the leg 67b, and the terminating edge 67c of the leg 67d, abut against respectively adjacent regions of the outer wall 52 of the platform 51. These defined wall regions thus act as stops limiting the degree of possible counterclockwise movement of the latch 67.

The terminating edge 67c of the latch 67 also functions as a cam surface that is positioned so as to be engaged by a pivotal operating lever 71, best seen in FIGS. 2–4. Considered more specifically, the operating lever 71 is secured to a shaft extension 73 that is suitably journalled in the vertically oriented frame arm 32 at an upper region thereof near the integral platform 51.

As mounted, the operating lever 71 has a normal vertically oriented downward position (FIGS. 2–4), whereat it rests against a stop in the form of an integral boss 76, and upon being pivoted counterclockwise has a temporary vertically oriented upward position (FIG. 5), whereat it rests against a stop in the form of an integral boss 77. While in its upward position, an edge region near the free end of the operating lever 71 engages the terminating cam edge 67c of the latch 67 (as depicted in FIG. 5) and, thereby, overcomes the normal counterclockwise bias exerted on the latch by the spring 69. As a result, the gear tooth-engaging end 67a of the latch engages the spur gear 61.

The operating lever 71 would normally be pivoted into its upwardly extending position, so as to lock the spur gears from rotating, only after the cams 53, 54 were pivoted into respective positions, such as depicted in FIG. 5, whereat they are displaced sufficiently to readily allow the supporting strand 12 to be initially positioned therebetween. To accomplish such angular rotation and separation of the cams, the spur gear support shaft 56, as best seen in FIGS. 2–4 and 6, may extend a short distance above both the platform 51 and the adjacent shaft 57. Such an extended shaft readily allows a hand-gripping rod 82 to extend through an aperture near the upper end of the shaft 56. It should be appreciated, however, that the gripping rod may be positioned immediately above the upper turn of the coil spring portion of the torsion spring 63 so as to allow the shaft 56 to be at the same, or nearly same, elevation as the shaft 57. While the rod 82 in that case may not be quite as accessible as when in the elevated position shown, the overall height of the cable block could be reduced, which would facilitate the packing, as well as possible handling, thereof.

In any event, the composite rod 82 and shaft 56 provides an essentially T-shaped handle by which an operator may manually rotate the spur gears simultaneously in opposite directions, which also effects the pivoting of the respectively associated cams in respectively corresponding directions, such that the latter may acquire the angular positions depicted in FIG. 5, or the mirror image thereof. While the cams are depicted in FIG. 5 as having been oriented 90° from their respective quiescent positions of FIG. 8, it should be appreciated that an initial rotation of the spur gears 61, 62 in the range of 45° to 60° is generally sufficient to separate the cams so as to allow the supporting strand 12 to be positioned therebetween.

Regardless of the direction and degree of spur gear rotation and cam pivoting effected by manually turning the handle 82 on the end of the shaft 56, if is only after this operation has been completed that the operating lever 71 is typically pivoted upwardly so as to then bias the latch 67 into engagement with the spur gear 61 and, thereby, hold the spring-biased cams apart temporarily, as previously described. The manner in which the operating lever 71 is allowed to pivot clockwise from its upwardly oriented position, depicted in FIG. 5, to its downwardly oriented position, depicted in FIGS. 2–4, while being suspended from a supporting strand 12, will be described in further detail hereinbelow.

Reference is now again made to the shaft extension 73 on which the operating lever 71 is mounted. As best seen in FIG. 4, on the side of the frame arm 32 opposite the lever 71, the shaft extension 73 is either secured to or becomes an integral part of a so-called keeper rod 84. This rod extends a short distance outwardly from the frame arm, and then extends upwardly at a predetermined angle.

Considering the keeper rod more specifically, the upper free end thereof is normally positioned either closely adjacent to, or preferably in contact with, an undercut, longitudinally disposed outer peripheral edge 44a of the upper overhanging wall portion 44 of the frame, best seen in FIG. 5. When so positioned, the keeper rod 84, together with the underside of the hanger-defining wall portions 43, 44, and the vertical arm 32, form a completely enclosed area that confines the strand 12. This insures that the cable block 15, once mounted on the supporting strand 12, can never become completely dislodged therefrom, even if the latter should, for any reason, accidentally become dislodged from between the wedging cams 53, 54, and possibly even the entire hanger section 41 of the frame.

The keeper rod 84 is normally locked in the strand-confining position, best seen in FIG. 4, when the operating lever 71 is in its downward, vertically oriented position resting against the stop 76. Such a locked position is effected by the operating lever having a notched portion 86 (FIGS. 2, 3) at its upper end that cooperates with a spring-biased detent, such as a retractable pin 87, mounted on a spring 88, secured within a bore in the frame arm 32.

When the operating arm 71 is moved counterclockwise to its upwardly extending vertical position, as depicted in FIG. 5, it not only pivots the latch 67 into engagement with the spur gear 61, as previously described, but it also rotates the shaft extension 73, on which it is mounted, by approximately 180°. This, in turn, orients the previously upwardly extending portion of the keeper rod 84 into a downwardly oriented position, as depicted in phantom in FIG. 4. This provides a substantial gap between the free end of the keeper rod 84 and the outer longitudinally extending edge of the upper hanger-defining wall portion 44 of the frame so as to allow a supporting strand 12 to be readily inserted therebetween during the mounting of the cable block 15 on the strand.

In a typical aerial cable installation application, each of a plurality of the cable blocks 15 embodied herein, as previously noted, are mounted in a spaced array along the supporting strand 12 either directly from a bucket truck, or from a remote point, such as from the ground, by means of a suitable pole or rod, not shown, but of the type depicted in the aforementioned patent of O. L. Walter. Attached to such a rod near the upper end thereof is a bifurcated or forked member constructed with sufficient space between the prongs thereof to accommodate the vertical arm 32 therebetween. The laterally disposed prongs of such a member are also preferably bifurcated, or at least curved and extend a short distance outwardly so as to support the cable block along the lower longitudinally extending edges 43a of the hanger section wall portion 43 (see FIGS. 2 and 3). The upper free end of such a rod is dimensioned in length and diameter so as to pass through an eyelet 94, preferably rotatably secured to and positioned near the free end of the operating lever 71, while the latter is oriented vertically upward, as depicted in FIG. 5.

After the pulley block 15 has been positioned on the strand 12 by means of the above described placement tool, for example, the latter is readily removed from the cable block by a workman on the ground simply pulling the rod-like free end of the tool out of the eyelet 94, thereby, permitting the operating lever 71 to commence pivoting clockwise in response to the initial biasing force exerted thereagainst by the spring-biased latch 67. The lever 71 ultimately becomes resiliently locked in its normal, downwardly extending position as a result of the cooperating action between the aforementioned notched portion 86 in the lever, and the spring-biased detent 87 secured to the frame arm 32. With the operating lever of the mounted cable block 15 in its normal position, the wedging cams 53, 54, as previously described, are spring-biased into positive engagement with the supporting strand 12.

From that point in time until the operating lever 71 is again pivoted upwardly, so as to lock the mating spur gears in angular positions that hold the intercoupled wedging cams 53, 54 out of engagement with the supporting strand 12, the composite cam mechanism 50, embodying the principles of the present invention, reliably and positively locks the cable block from any appreciable displacement in one preselected direction along the strand, while allowing relatively free movement of the block in the opposite direction. As such, the cable block functions as a reliable, temporary cable support that greatly facilitates the lashing of the aerial cable 17 to the supporting strand 12 between any given span defined between two utility poles, such as of the type illustrated in FIG. 1.

Moreover, by reason of the cable block 15 being constructed so as to allow reversible mounting on the supporting strand, the blocks, as previously noted, may advantageously also be alternately reversed in orientation along the strand, as depicted in FIG. 1. This provides further assurance, such as under very windy conditions, that the supported cable 17 cannot become sufficiently skewed, relative to the strand, so as to ever slip off the open side of more than one cable block pulley 19 of any three successive cable blocks forming the array thereof.

It is obvious that various modifications may be made to the illustrative embodiment of the invention, and that a number of alternatives may be provided without departing from the spirit and scope of the present invention. For example, the composite frame 31 may be readily formed with the upper hanger section, and/or the spur gear-cam support platform comprising separate piece parts suitably secured to the upper end of the vertical arm. From a cost standpoint, however, it is desirable to form the composite frame 31 as a single die cast member.

What is claimed is:

1. A cable block adapted for mounting on a supporting strand, and for temporarily supporting a section of cable prior to the latter being supported along and by the strand comprising:
   a frame having at its upper end a strand-engaging hanger section, and at its lower end a pulley support section
   a pulley rotatably mounted on said lower support section for temporarily supporting and guiding the cable, and
   a strand confining and cable block locking means mounted on said upper frame hanger section, said means including a pair of pivotal cams adapted to engage said strand from opposite sides thereof such that said cams permit axial movement of said cable block along said strand in only one preselected direction, which direction depending on the particular oppositely inclined angles of orientation chosen for said cams relative to an engaged strand, while positively locking said cable block from movement along said strand in the opposite direction.

2. A cable block in accordance with claim 1 wherein said cams are symmetrically disposed with respect to said strand, are of essentially heart-shaped configuration, with singular, corresponding pronounced apices, and are spring-biased with respect to pivotal movement in either direction from respective quiescent positions wherat an imaginary centerline passes through the pivot points and the corresponding apices thereof, and wherein at least the peripheral edges of said cams that may selectively be brought into engagement with a supporting strand, when confined therebetween, are formed with a taper that extends upwardly and outwardly so as to tend to wedge the strand not only between said mutually disposed tapered cam edges, but against an adjacent and stationary surface of the upper hanger section of the cable block frame.

3. A cable block in accordance with claim 2 further including:
   means to intercouple said cams so as to produce simultaneous pivotal displacement of the cams, but in opposite directions.

4. A cable block in accordance with claim 3 wherein said means to intercouple said cams comprises a pair of mating spur gears, each gear coupled through a different shaft to an associated one of said cams, and wherein one of said shafts has manual hand-grasping means mounted near the upper free end thereof so as to allow manual shaft rotation in either direction.

5. A cable block in accordance with claim 4 further comprising:
   releasable latch means, including a pivotal latch having a first position, for engaging and locking said spur gears in desired angular positions, in opposition to the biasing forces imparted thereagainst, so as to provide sufficient space between said cams to allow a supporting strand to be positioned therebetween, and said latch having a second position for releasing said spur gears for rotation such that said cams intercoupled thereto are brought into biased engagement with said previously positioned strand, said latch means further including latch-actuating means to move said latch selectively to said first and second positions, and
   movable keeper means, actuated by said latch-actuating means, comprising an elongated member rotatably mounted at one end on said frame arm and having open and closed positions, said keeper means being configured such that when in its open position, in response to said latch-actuating means moving said latch to its first position, a strand may be readily inserted between said keeper means and the outer and underside portion of said upper frame hanger section nearest thereto while mounting said cable block on said strand, and when said keeper means is in its closed position, after said cable block has been mounted on a strand, and in response to said latch-actuating means allowing said latch to move to its second position, the strand is completely enclosed by said frame and keeper means in the event that the strand should accidentally become dislodged from between said cams.

6. A cable block adapted for mounting on a supporting strand during the installation of aerial cable, and for temporarily supporting a section of such cable prior to its being lashed to the strand, comprising:
   a frame having an upper strand engaging hanger section, a lower U-shaped pulley support section, and an integral arm interconnecting a common side of the upper and lower sections, and forming one leg of said U-shaped section;
   a cable supporting and guiding pulley rotatably mounted within and on said lower U-shaped section, and
   strand engaging means mounted on said upper frame hanger section, said last mentioned means including a pair of pivotally mounted cams that are spaced apart and configured such that they are capable of providing a variable strand receiving space therebetween, said space depending on the particular angular orientations of said cams relative to common reference positions therefor, said strand engaging means further comprising means for intercoupling and spring-biasing said cams such that they may be rotated simultaneously in opposite directions relative to each other, and each in either angular direction relative to said reference position, in opposition to a biasing force, said cams thereby being adapted to wedge against an interposed strand from essentially diametrically disposed sides thereof, with the pre-chosen oppositely inclined angles of orientation of said cams, relative to the strand, determining the respective directions of relatively free axial movement, and positive locking against movement, of said cable block along said strand.

7. A cable block in accordance with claim 6 wherein said cams are symmetrically disposed with respect to said strand, are of identical and essentially heart-shaped configuration, with singular, corresponding pronounced apices, and wherein said cams have tapered edges that extend upwardly and outwardly along those peripheral regions thereof that may selectively be brought into engagement with a supporting strand, said cams thus being adapted to wedge the strand not only between said mutually disposed and tapered cam edges, but against an adjacent and stationary surface of the upper frame hanger section of the cable block frame.

8. A cable block in accordance with claim 7 wherein said means for intercoupling said cams comprises a pair of mating spur gears, each gear coupled through a different shaft to an associated one of said cams, and wherein one of said shafts has manual hand-grasping means mounted near the upper free end thereof so as to allow manual shaft rotation in either direction, and wherein said cable block further includes:

releasable latch means including a pivotal latch which, while in a first position, engages and locks said spur gears, in opposition to the biasing forces imparted thereagainst, in angular positions sufficient to allow a strand to be interposed between said intercoupled cams, and which latch, upon being moved to a second position, releases said spur gears for rotation such that said intercoupled cams are brought into biased engagement with said previously positioned supporting strand, said latch means further including lever means having first and second pivotal positions that respectively effect the positioning of said latch in its first and second positions, selectively.

9. A cable block in accordance with claim 8 further including:

movable keeper means having open and closed positions and being actuated by said lever means, said keeper means having an outwardly extending free end and an opposite end rotatably mounted on said frame arm, said keeper means being configured such that when in its open position, in response to said lever means being in its first position, allowing a strand to be readily inserted between said keeper means and the outer and underside portion of said upper hanger frame section nearest thereto while mounting said cable block on said strand, and said keeper means when moved to its alternate closed position, after said cable block has been mounted on a strand, and in response to said lever means being moved to its second position, reliably enclosing the strand within the area defined by said frame and keeper means in the event that it should accidentally become dislodged from between said cams.

10. A cable block in accordance with claim 9 wherein said pivotal latch is essentially in the form of a bell crank, having a gear-tooth-engaging forward end, and an oppositely disposed rearward cam edge that is positioned to be selectively contacted by said lever means, wherein spring means are provided to normally bias said latch out of engagement with an associated one of said spur gears, and wherein said lever means is pivotally mounted on an upper end region of said frame arm, and is normally resiliently locked in said second position that allows said latch to be out of engagement with said associated spur gear, and maintains said keeper means in its closed position.

* * * * *